(12) United States Patent
Takahashi (10) Patent No.: US 8,406,910 B2
(45) Date of Patent: Mar. 26, 2013

(54) MANAGEMENT DEVICE, PRODUCTION MANAGEMENT DEVICE, PRODUCTION MANAGEMENT SYSTEM

(75) Inventor: Hiroki Takahashi, Tokyo (JP)

(73) Assignee: NEC Corporation, Tokyo (JP)

( * ) Notice: Subject to any disclaimer, the term of this patent is extended or adjusted under 35 U.S.C. 154(b) by 167 days.

(21) Appl. No.: 12/682,339

(22) PCT Filed: Oct. 7, 2008

(86) PCT No.: PCT/JP2008/002819
§ 371 (c)(1),
(2), (4) Date: Apr. 9, 2010

(87) PCT Pub. No.: WO2009/047890
PCT Pub. Date: Apr. 16, 2009

(65) Prior Publication Data
US 2010/0217422 A1    Aug. 26, 2010

(30) Foreign Application Priority Data

Oct. 12, 2007    (JP) ................. 2007-266946

(51) Int. Cl.
*G06F 17/00* (2006.01)
*G06F 19/00* (2011.01)
(52) U.S. Cl. .............. 700/107; 700/97; 705/28
(58) Field of Classification Search .............. 700/95–99, 700/106, 107; 705/7.12–7.26, 29, 28
See application file for complete search history.

(56) References Cited

U.S. PATENT DOCUMENTS

| 4,862,376 | A  | * | 8/1989  | Ferriter et al. ............... 700/107 |
| 5,907,488 | A  | * | 5/1999  | Arimoto et al. ............... 700/97 |
| 6,889,107 | B2 | * | 5/2005  | Yuda et al. .................... 700/107 |
| 7,127,458 | B1 | * | 10/2006 | Mantripragada et al. ....... 707/6 |
| 7,606,628 | B2 | * | 10/2009 | Azuma ........................ 700/107 |
| 7,711,613 | B2 |   | 5/2010  | Ogawa et al. |
| 2008/0154628 | A1 |  | 6/2008  | Ogawa et al. |
| 2010/0312674 | A1 | * | 12/2010 | Kataria et al. ................. 705/28 |
| 2011/0029120 | A1 | * | 2/2011  | Kienzle ........................ 700/107 |
| 2011/0040596 | A1 | * | 2/2011  | Chen et al. ..................... 705/8 |

FOREIGN PATENT DOCUMENTS

| JP | 2002-73150 A  | 3/2002 |
| JP | 2003-58225 A  | 2/2003 |
| JP | 2003-196348 A | 7/2003 |
| JP | 2004-62526 A  | 2/2004 |
| JP | 2004-192352 A | 7/2004 |
| JP | 2005-108073 A | 4/2005 |
| JP | 2006-4277 A   | 1/2006 |
| JP | 2006-139748 A | 6/2006 |

* cited by examiner

*Primary Examiner* — Dave Robertson
(74) *Attorney, Agent, or Firm* — Foley & Lardner LLP (57) ABSTRACT

A design management device for managing data has a unit design storage section for storing unit design data with corresponding part design data, a product design storage unit for storing product design data together with the corresponding unit design data, a data transmission unit for sending the product design data to the production management device together with the unit design data and the part design data, a transmission determination unit for determining whether or not the unit design data was transmitted in the past, and a transmission control unit that does not transmit corresponding part design data when the unit design data determined to have been transmitted in the past is sent.

7 Claims, 8 Drawing Sheets

| PRODUCTION NUMBER | PRODUCT NUMBER | STRUCTURE ID | PARENT ID |
|---|---|---|---|
| 1-1 | X | 1 | |
| 1-2 | A | 2 | 1 |
| 1-3 | B | 3 | 1 |
| 1-4 | C | 4 | 1 |
| 1-5 | A-1 | 5 | 2 |
| 1-6 | A-2 | 6 | 2 |
| 1-7 | C-1 | 7 | 4 |
| 1-8 | C-2 | 8 | 4 |
| 1-9 | A-3 | 9 | 5 |
| 1-10 | C-3 | 10 | 7 |

FIG. 7

| PRODUCT NUMBER | Ver. | SITE TRANSFER FLAG | STRUCTURE ID | PARENT ID |
|---|---|---|---|---|
| B | 1 | 1 | 1 | |
| B-1 | 1 | 1 | 2 | 1 |
| B-2 | 1 | 1 | 3 | 1 |
| B-3 | 1 | 1 | 4 | 2 |

| PRODUCT NUMBER | Ver. | SITE TRANSFER FLAG | STRUCTURE ID | PARENT ID |
|---|---|---|---|---|
| B | 2 | 0 | 1 | |
| B-1 | 1 | 1 | 2 | 1 |
| B-2 | 2 | 0 | 3 | 0 |
| B-3 | 1 | 1 | 4 | 2 |
| B-4 | 1 | 0 | 5 | 1 |
| B-5 | 1 | 0 | 6 | 4 |
| B-6 | 1 | 0 | 7 | 4 |

MANAGEMENT DEVICE, PRODUCTION MANAGEMENT DEVICE, PRODUCTION MANAGEMENT SYSTEM

This application is the National Phase of PCT/JP2008/002819, filed Oct. 7, 2008, which claims priority to Japanese Application No. 2007-266946, filed Oct. 12, 2007, the disclosures of which are hereby incorporated by reference in their entirety.

TECHNICAL FIELD

The present invention relates to a design management device, a production management device, and a production management system for managing data for the design of a final produced product.

BACKGROUND ART

Conventionally, manufacturers producing electrical equipment etc. use production management systems. Data for the parts necessary to produce products is then managed while developing a new product so that parts can be shared and ordered.

For example, technology where the management of product construction and the ordering of production is carried out using separate systems is disclosed in patent document 1. This system is a coordinated system where a product data management system (Product Data Management (PDM)) for making and managing order information and parts information for product groups constituting equipment taken as the production target and a production ordering system (Enterprise Resource Planning (ERP)) for setting expiration dates and performing production control etc. relating to production of equipment taken as the production target operate in a coordinated manner.

[Patent Document 1] Japanese Unexamined Patent Publication No. 2004-192352.
[Patent Document 2] Japanese Unexamined Patent Publication No. 2006-139748.

SUMMARY

According to the technology of patent document 1, however, configuration information for parts from the PDM system is recorded in the ERP system for each part for which the design is complete. This does not give consideration to the manner in which a production plan is to be changed in the event that the design of a part is changed.

In patent document 2, technology is disclosed where it is possible to change or cancel orders for parts on the side of the production management device when changes in the design occur. However, duplicate information is received because data is inputted for all of the parts for which changes occur. This causes the amount of information at the production management device to overflow.

In order to resolve the above situation, the present invention simplifies the management of data for a production management side system in a system for managing the design and production of final produced product.

According to an exemplary aspect of the present invention, there is provided a design management device for managing data for the design of a final produced product including:

a unit design storage section for storing unit design data for a unit of assembled parts produced so as to include at least one minimum unit part together with corresponding part design data for the minimum unit part;

a product design storage unit for storing product design data for the final produced product produced so as to include at least one unit of assembled parts together with the corresponding unit design data;

a data transmission unit for sending the product design data to the production management device for managing data for the production of the final produced product together with the corresponding unit design data and the part design data;

a transmission determination unit for determining whether or not the unit design data for the product design data sent to the production management device was transmitted in the past; and a transmission control unit that does not transmit corresponding part design data when the unit design data determined to have been transmitted in the past is sent.

According to an exemplary aspect of the present invention, there is provided a design management method for managing data for the design of a final produced product including:

storing unit design data for a unit of assembled parts produced so as to include at least one minimum unit part together with corresponding part design data for the minimum unit part;

storing product design data for the final produced product produced so as to include at least one unit of assembled parts and the corresponding unit design data;

sending the product design data to the production management device for managing data for the production of the final produced product together with the corresponding unit design data and the part design data;

determining whether or not the unit design data for the product design data sent to the production management device was transmitted in the past; and ensuring that corresponding part design data is not transmitted when the unit design data determined to have been sent in the past is sent.

According to an exemplary aspect of the present invention, there is provided a program for managing data for the design of a final produced product including:

a unit design storage section for storing unit design data for a unit of assembled parts produced so as to include at least one minimum unit part together with corresponding part design data for the minimum unit part;

a product design storage unit for storing product design data for the final produced product produced so as to include at least one unit of assembled parts together with the corresponding unit design data;

a data transmission unit for sending the product design data to the production management device for managing data for the production of the final produced product together with the corresponding unit design data and the part design data;

a transmission determination unit for determining whether or not the unit design data for the product design data sent to the production management device was transmitted in the past; and a transmission control unit that does not transmit corresponding part design data when the unit design data determined to have been transmitted in the past is sent.

implemented on a computer.

According to an exemplary aspect of the present invention, there is provided a production management device for managing data for the production of a final produced product including:

a unit production storage section for storing unit production data for a unit of assembled parts produced so as to include at least one minimum unit part together with corresponding part production data for the minimum unit part;

a product production storage unit for storing product production data for the final produced product produced so as to include at least one unit of assembled parts and the corresponding unit production data;

a data receiving unit for receiving corresponding unit design data for at least one unit of assembled parts together with product design data for the final produced product from the design management device managing data for the design of the final produced product;

a product production registration unit for registering the received product design data in the product production storage unit as the product production data;

a unit production registration section for registering the part design data in the unit production storage section as the part production data when the part design data for at least one minimum unit is received together with the unit design data, and registering the unit design data in the unit production storage section so as to be unit production data that includes part or all of the unit design data;

a registration determination unit for determining whether or not the unit design data for the newly received product design data is registered as unit production data including part or all of the unit design data; and a data interpolation unit for acquiring the part production data corresponding to the unit production data determined to be registered from the unit production storage section for interpolating the product design data.

According to an exemplary aspect of the present invention, there is provided a production management method for managing data for the production of a final produced product including:

storing unit production data for a unit of assembled parts produced so as to include at least one minimum unit part together with corresponding part production data for the minimum unit part;

storing product production data for the final produced product produced so as to include at least one unit of assembled parts and the corresponding unit production data;

receiving corresponding unit design data for at least one unit of assembled parts together with product design data for the final produced product from the design management device managing data for the design of the final produced product;

registering the received product design data as the product production data;

registering the part design data as the part production data when part design data for at least one minimum unit is received together with the unit design data, and registering the unit design data so as to be unit production data that includes part or all of the unit design data;

determining whether or not the unit design data for the newly received product design data is registered as unit production data including part or all of the unit design data; and acquiring the part production data corresponding to the unit production data determined to be registered for interpolating the product design data.

According to an exemplary aspect of the present invention, there is provided a program for managing data for the production of a final produced product including:

a unit production storage section for storing unit production data for a unit of assembled parts produced so as to include at least one minimum unit part together with corresponding part production data for the minimum unit part;

a product production storage unit for storing product production data for the final produced product produced so as to include at least one unit of assembled parts and the corresponding unit production data;

a data receiving unit for receiving corresponding unit design data for at least one unit of assembled parts together with product design data for the final produced product from the design management device managing data for the design of the final produced product;

a product production registration unit for registering the received product design data in the product production storage unit as the product production data;

a unit production registration section for registering the part design data in the unit production storage section as the part production data when the part design data for at least one minimum unit is received together with the unit design data, and registering the unit design data in the unit production storage section so as to be unit production data that includes part or all of the unit design data;

a registration determination unit for determining whether or not the unit design data for the newly received product design data is registered as unit production data including part or all of the unit design data; and a data interpolation unit for acquiring the part production data corresponding to the unit production data determined to be registered from the unit production storage section for interpolating the product design data, implemented on a computer.

Further, according to an exemplary aspect of the present invention, there is provided a production management system where a design management device for managing data for the design of the final produced product and a production management device for managing data for production of a final produced product are connected via a network, the design management device including:

a part design storage unit for storing part design data for minimum unit parts;

a unit design storage section for storing unit design data for a unit of assembled parts produced so as to include at least one minimum unit part together with corresponding part design data for the minimum unit part;

a product design storage unit for storing product design data for the final produced product produced so as to include at least one unit of assembled parts together with the corresponding unit design data;

a data transmission unit for sending the product design data to the production management device together with the corresponding unit design data and the part design data;

a transmission determination unit for determining whether or not the unit design data for the product design data sent to the production management device was transmitted in the past; and a transmission control unit that does not transmit corresponding part design data when the part design data determined to have been transmitted in the past is sent, and the production management device including:

a unit production storage section for storing unit production data for a unit of assembled parts and corresponding part production data for the minimum unit part;

a product production storage unit for storing product production data for the final produced product together with the corresponding unit production data;

a data receiving unit for receiving corresponding unit design data for at least one unit of assembled parts together with product design data for the final produced product from the design management device;

a product production registration unit for registering the received product design data in the product production storage unit as the product production data including some or all of the unit design data;

a unit production registration section for registering the part design data in the unit production storage section as the part production data when the part design data for at least one minimum unit is received together with the unit design data, and registering the unit design data in the unit production storage section so as to be unit production data that includes part or all of the unit design data;

a registration determination unit for determining whether or not the unit design data for the newly received product design data is registered as unit production data including part or all of the unit design data; and a data interpolation unit for acquiring the part production data corresponding to the unit production data determined to be registered from the unit production storage section for interpolating the product design data.

According to the present invention, at the system for managing the design and production of the final produced product, by having the design side and production side systems operate in cooperation, it is possible to keep the data it is necessary to send from the design side to the production side to a minimum, and it is possible to make data management for the production side system simple.

BRIEF DESCRIPTION OF THE DRAWINGS

The above object, other objects, characteristics and features will become clear from the following exemplary embodiments and accompanying drawings.

EXEMPLARY EMBODIMENT

Exemplary embodiments of the present invention are explained in the following using the drawings. Elements of the configuration that are the same are given the same numerals in all of the diagrams and descriptions thereof are omitted as appropriate.

Figure 1:
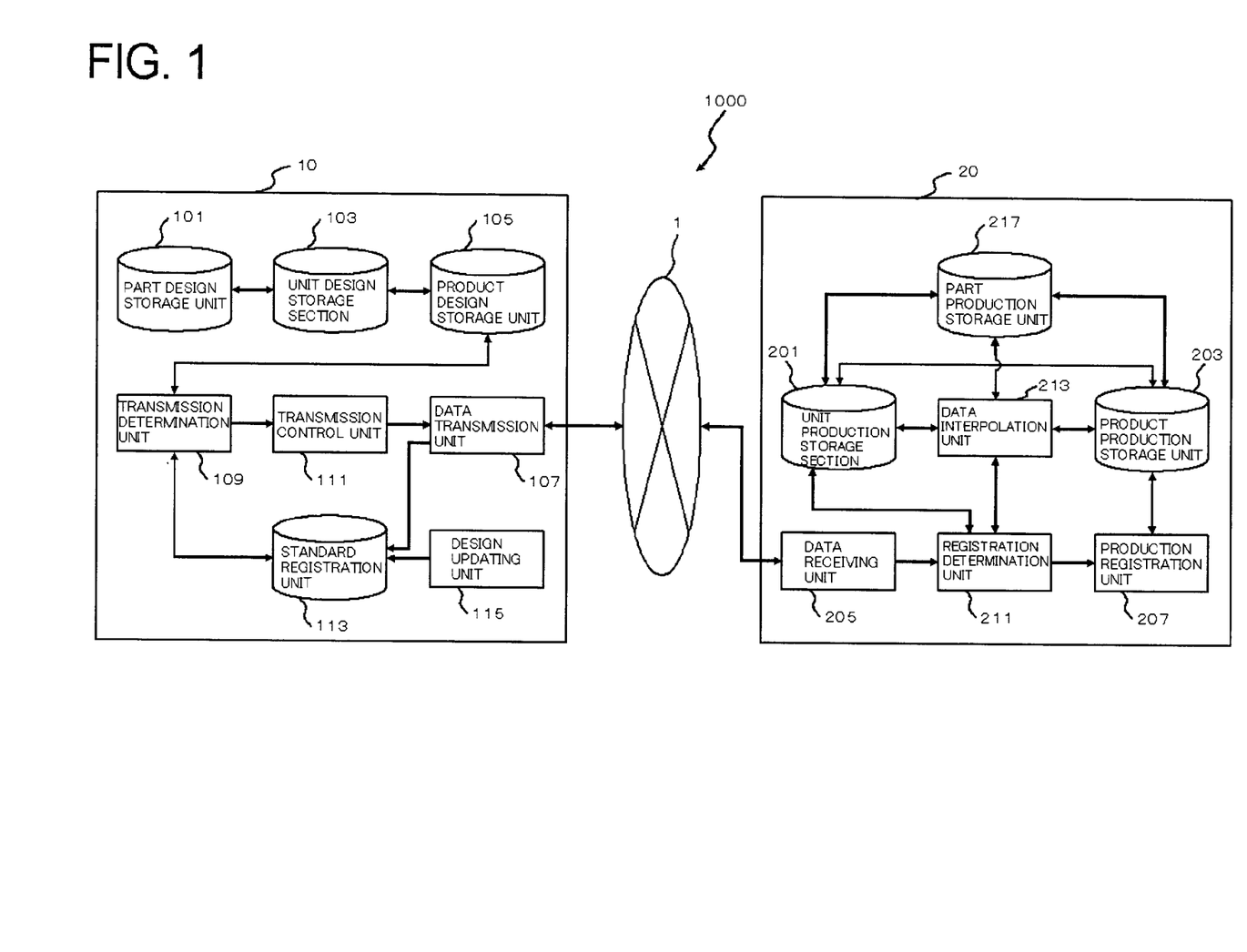
FIG. 1 is a block diagram of a configuration for a production management system of a exemplary embodiment.

FIG. 1 is a block diagram of a configuration for a production management system 1000 of this exemplary embodiment. This exemplary embodiment is the production management system 1000 where a design management device 10 for managing data for the design of the final produced product and a production management device 20 for managing data for the production of the final produced product are connected via a network 1.

The design management device 10 and the production management device 20 can be configured from dedicated hardware such as a CPU (Central Processing Unit), ROM (Read Only Memory), RAM (Random Access Memory), and I/F (Interface) unit, from dedicated logic circuitry for implementing prescribed data processing, or from a combination thereof that enables a computer program to be read in and corresponding data processing to be executed.

In this exemplary embodiment, execution of various operations corresponding to the computer program at the design management device 10 and the production management device 20 refers to the operational control of the various devices at the data processing device.

For example, the storing of various data in the design management device 10 and the production management device 20 is the storing of various data by the CPU in information storage media such as a Hard Disk Drive (HDD) fixed at the design management device 10 and the production management device 20 and the storing of various data by the CPU in information storage media such as a Compact Disc-Recordable (CD-R) installed in a freely interchangeable manner at the data processing device using a CD drive.

The network 1 is such that the design management device 10 and the production management device 20 are connected by some kind of means such as cable such as copper wiring or optical fiber, infrared, or radio waves so as to be capable of exchanging data. For example, a network 1 can be a LAN (Local Area Network), wireless LAN, WAN (Wide Area Network), Intranet, or a global scale Internet where a number of LANS and WANS are connected together.

The design management device 10 comprises a part design storage unit 101, a unit design storage unit 103, a product design storage unit 105, a data transmission unit 107, a transmission determination unit 109, a transmission control unit 111, a standard registration unit 113, and a design update unit 115.

The part design storage unit 101 stores part design data for minimum unit parts. A minimum unit part is a part of a minimum unit that can be utilized as a unit at this production site and is, for example, a press part or bolt nut etc. It is also possible for a unit of assemble parts manufactured from a number of parts and stored at another location to constitute a minimum unit part at a certain manufacturing site.

The unit design storage unit 103 stores unit design data for a unit of assembled parts manufactured using a number of minimum unit parts together with corresponding part design data. Further, the unit design storage unit 103 can also store information indicating an assembled structure for the unit of assembled parts constructed from the minimum unit parts. The unit of assembled parts is comprised of an assembly utilized in the production of the minimum manufactured product manufactured using a plurality of minimum unit parts. The unit of assembled parts can also be manufactured from a plurality of units of assembled parts and the unit of assembled parts can be present at a number of stages from minimum unit parts to final produced products.

A final produced product is a product that is formed from a number of units of the symbol parts and minimum unit parts and shipped and is, for example, household goods provided to the consumer market. It is also possible to utilize minimum production parts shipped from the production site as minimum unit parts and units of assembled parts at other sites.

The product design storage unit 105 stores product design data for the final produced products produced using a number of units of assembly parts together with corresponding unit design data. Further, the product design storage unit 105 is also capable of storing information indicating an assembly structure for the final production parts constructed from the units of assembled parts.

The data transmission unit 107 sends product design data to the production management device 20 together with corresponding unit design data and part design data.

After transmission, the data transmission unit 107 sends the transmitted unit design data to the standard registration unit 113 together with the part design data.

The standard registration unit 113 registers a transmitted unit design data as standard design data. The standard registration unit 113 registers unit design data as standard design data together with information indicating the assembly structure for the minimum unit parts.

When an instruction to transmit product design data is received from the user, the transmission determination unit 109 reads the product design data to be transmitted from the product design storage unit 105 and determines whether or not the unit design data for the product design data to be transmitted to the production management device 20 has been transmitted in the past. A transmission record for the unit design data is stored in a correlated manner in the standard registration unit 113 together with a transmission record for the corresponding part design data. The transmission determination unit 109 can then determine whether or not the unit design data for the product design data to be transmitted has been transmitted in the past by referring to the transmission records. It is also possible for the transmission determination unit 109 to determine whether or not standard design data is present in the unit design data for the product design data to be transmitted to the production management device 20. The transmission determination unit 109 sends the standard design data to be transmitted to the transmission control unit 111 together with the determination results.

The transmission control unit 111 reads out the determination results and omits corresponding part design data when transmitting unit design data determined to have been transmitted in the past. The transmission control unit 111 omits transmission of the corresponding part design data when transmitting unit design data determined to be standard design data. The unit design data can also include identification information for specifying units assembled from parts. The transmission control unit 111 can also send corresponding identification information when sending unit design data determined to have been sent in the past. Specifically, the transmission control unit 111 extracts only identification information from the standard design data and replaces the extracted identification information with corresponding unit design data. It is also possible, for example, to use an item number for units of assembled parts as identification information. Product design data processed in this manner is sent to the data transmission unit 107 and is sent towards the production management device 20 from the data transmission unit 107. Namely, only identification information that identifies units of assembled parts of standard design data included in the transmitted product design data is transmitted, and part design data is omitted. The design management device 10 does not transmit corresponding part design data when transmitting unit design data determined to have been transmitted in the past.

The design update unit 115 updates the standard design data by receiving changes to the part design data. When the standard design data is updated, the transmission determination unit 109 reads out the updated standard design data together with the changed part design data from the standard registration unit 113 and sends this data to the transmission control unit 111. At this time, the transmission determination unit 109 can also update the corresponding unit design data stored in the unit design storage unit 103. The transmission control unit 111 omits part design data that is not changed and performs transmission to the data transmission unit 107. In this way, the data transmission unit 107 sends updated unit design data to the production management device 20 together with the changed part design data when the unit design data is updated.

The production management device 20 includes a unit production storage unit 201, a product production storage unit 203, a data receiving unit 205, a production registration unit 207, a registration determination unit 211, a data interpolation unit 213, and a parts production storage unit 217.

The unit production storage unit 201 stores unit production data for units of assembled parts produced using a plurality of a minimum unit parts together with corresponding part production data for minimum unit parts.

The product production storage unit 203 stores product production data for the final produced products produced using a number of units of assembled parts together with corresponding unit production data.

The data receiving unit 205 receives product design data for the final produced product from the design management device 10 that manages data for the design of the final produced product together with unit design data for corresponding units of assembled parts. The received data is sent to the registration determination unit 211.

The registration determination unit 211 determines whether or not unit design data for the newly received product design data is recorded as unit production data including some or all of the unit design data. Specifically, the unit production storage unit 201 is referred to and it is determined whether or not the received unit design data is stored. It is also determined whether or not part design data corresponding to the received unit design data is included. When the part design data is omitted, the data interpolation unit 213 is instructed to extract corresponding unit production data. When it is determined that unit design data is not registered, the registration determination unit 211 extracts the part design data from the received product design data together with the unit design data and transmits this to the production registration unit 207.

The data interpolation unit 213 acquires product production data corresponding to the unit production data determined to be registered from the unit production storage unit 201 and uses this to interpolate the product design data.

Specifically, the unit production data is extracted from the unit production storage unit 201 using an instruction from the registration determination unit 211 and is sent to the registration determination unit 211. This means that product design data when the part design data has been omitted can be subjected to data interpolation. Interpolated product design data is then sent to the production registration unit 207.

The production registration unit 207 registers the received product design data in the product production storage unit 203 as product production data (product production registration unit). When a plurality of minimum unit part design data is received together with the unit design data, the production registration unit 207 takes the part design data as the power production data and registers the unit design data in the unit production storage unit 201 as unit production data including the unit design data either partially or and its entirety (unit production registration section).

The data interpolation unit 213 acquires product production data corresponding to the unit production data determined to be registered from the unit production storage unit 201 and uses this to interpolate the product design data.

The parts production storage unit 217 stores the part production data in a manner correlated with the number of minimum unit parts. The parts production storage unit 217 stores the part production data in a manner correlated with the number of minimum unit parts based on the received product design data.

The production management device 20 can also receive update information for the unit design data and can update unit production data based on the received update information. Specifically, the data receiving unit 205 receives update information for the unit design data. The received update information is sent to the registration determination unit 211. The registration determination unit 211 refers to the unit production storage unit 201 and reads out update information for the unit design data. For example, the version of the unit design data is appended to the update information. The registration determination unit 211 can therefore determine whether the version of the unit design data stored in the unit production storage unit 201 matches. As a result, the registration determination unit 211 can read out that the update data is updated information for unit design data. The registration determination unit 211 can update the unit production data based on the received update information sent to the data interpolation unit 213.

The product design data and the product production data can also be made to be, for example, a BOM (Bill of Materials). A BOM can also be a table and data expressing how many of which minimum unit parts are required collectively. The BOM data structure can adopt the form of a list or the form of a tree structure.

E-BOM (Engineering BOM) can also be adopted as product design data stored in the design management device 10. The product design data defines the structure for the minimum unit parts and the units of assembled parts. Namely, the product design data is configured from the part design data and the unit design data. As a result, it is possible to perform management so that information for the final produced product is not omitted. By adopting E-BOM as the product design data, it is possible to manage the unit design data with regards to which minimum unit parts a unit of assembled parts is configured from and it is possible for detailed information for the units of assembled parts, i.e. the unit design data to be easy to get to. The product design data can correlate to the CAD data and collectively display information such as cost and name possessed as attributes. As a result, it is possible to acquire information relating to the final produced product. The final design data can also be made using a cad function that outputs a list of minimum unit parts and units of assembled parts as a BOM. At this time, a BOM can be generated for a hierarchical structure as the result of reading in units of assembled parts from unit of assembled parts for an upper hierarchical layer.

It is also possible for the design process to be made more efficient by adopting E-BOM for the product design data. It also becomes more straightforward to change the position of the unit of assembled parts by making a collection of minimum unit parts into a unit of assembled parts in functional units. It is also possible for the flow to the products to be made straightforward by making the unit design data standard design data.

On the other hand, it is also possible to adopt M-BOM (Manufacturing BOM) as the product production data stored in the production management device 20. The product production data can be used in the ordering of the minimum unit parts. The ordering of the parts can be made the main object at the production management device 20. It is therefore requested to have information regarding how many of which minimum unit parts and units of assembled parts are necessary in certain processes in the production stage. It is possible to then obtain the number of minimum unit part orders for the suppliers and the timing of the orders, and the content of the production of instructions given in each process based on this product production data, master information such as the work time in each step and delay time from ordering to delivery of minimum unit parts, and stock information for the minimum unit parts and the units assembled from parts.

The units of assembled parts can be produced using one or a plurality of minimum unit parts or can be produced using one or a plurality of units of assembled parts that have already been produced. It is also possible for the units of assembled parts to be produced from one or a plurality of units of assembled parts or from minimum unit parts that have already been produced.

The final produced product can also be produced from one or a plurality of units of assembled parts or can be produced from one or a plurality of units of assembled parts and minimum unit parts.

An explanation is now given of the operation of the production management system 1000.

Figure 2:
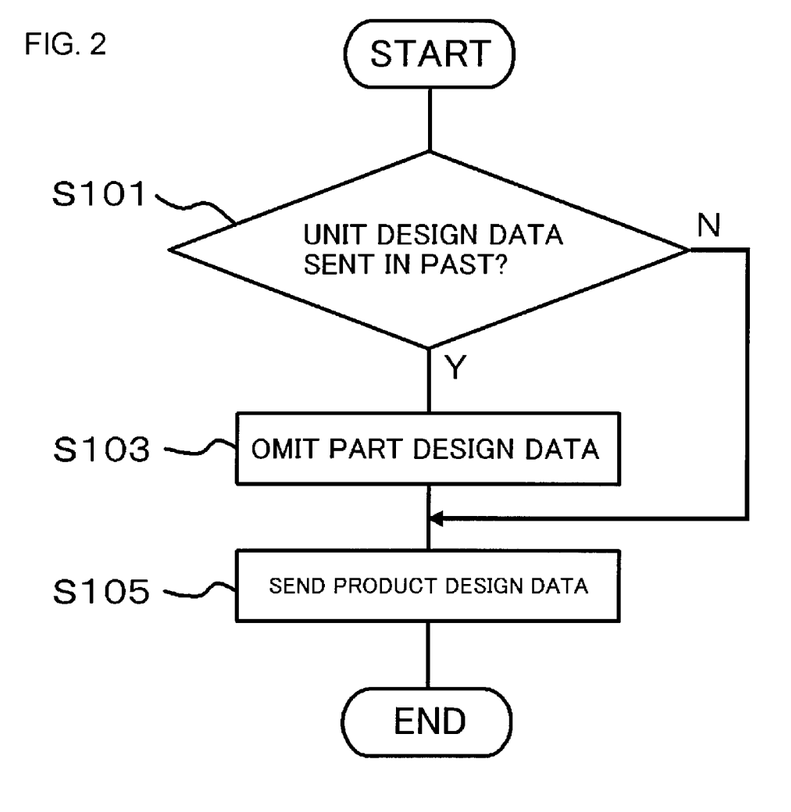
FIG. 2 is a flowchart of a design management method of the exemplary embodiment.

FIG. 2 is a flowchart of a design management method of the design management device 10. As the result of receiving instruction from the user, the design management device 10 sends the product design data to the production management device 20 together with the corresponding unit design data and part design data. At this time, it is determined whether or not the unit design data for the product design data sent to the production management device 20 has been sent in the past (S101). The unit design data determined to have been sent in the past (S101Y) is omitted from the corresponding transmission of part design data (S103). On the other hand, transmission takes place with the corresponding part design data remaining appended (S105) for unit design data that is determined not to have been transmitted in the past (S101N).

Figure 3:
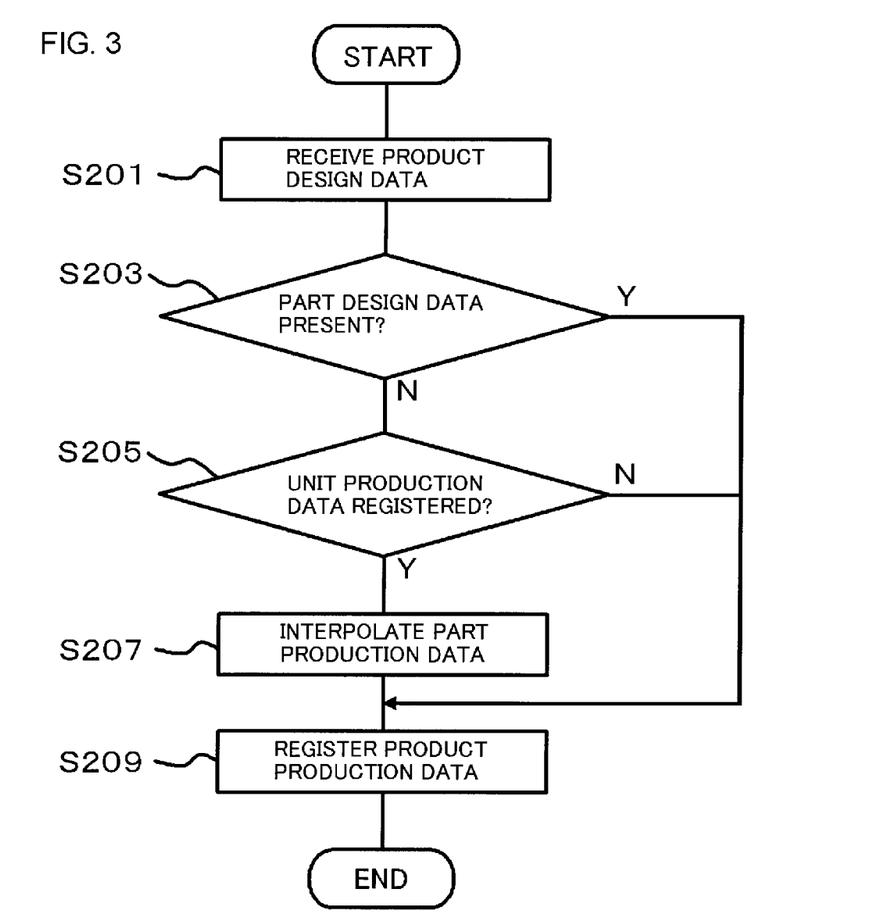
FIG. 3 is a flowchart of a production management method of the exemplary embodiment.

FIG. 3 is a flowchart of a production management method of the production management device 20. The production management device 20 receives product design data together with corresponding unit design data from the design management device 10 (S201). When the production management device 20 receives the unit design data together with a plurality of product design data for minimum units (S203Y), the part design data is taken to be part production data, the unit design data is taken to be unit production data and the product production data is registered (S209). When the product design data where part of the part design data has been omitted is received (S203N), it is determined whether or not unit design data for the received product design data is to be registered as unit production data (S205). When it is determined to be registered (S205Y), part production data corresponding to the unit production data is acquired and interpolating the product design data (S207). The production management system 1000 registers the received product design data as product production data (S209). When corresponding unit production data is not registered (S205N), the received product design data is registered as is as product production data. Unit design data determined to be newly received is therefore registered as unit production data.

Figure 4:
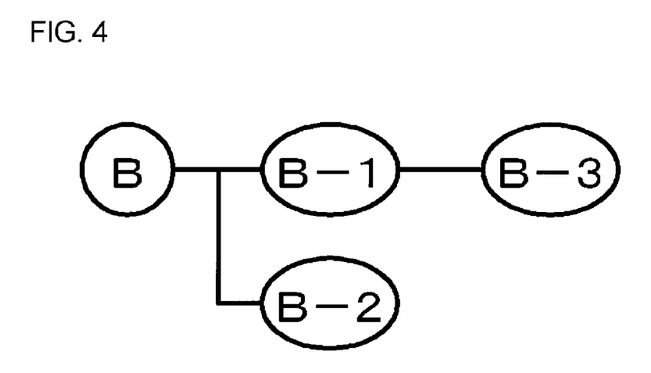
FIG. 4 is a view showing an example of a structure for unit design data of the exemplary embodiment.

A detailed explanation is given in the following of the production management system 1000 of this exemplary embodiment using FIG. 1. Unit design data is stored together with corresponding part design data in the unit design storage unit 103. FIG. 4 shows an example of the data structure for the unit design data. A configuration for a unit of assembled parts of the part number B is illustrated in FIG. 4. The unit B of assembled parts is configured from minimum unit parts of part numbers B-1, B-2, and B-3.

Figure 5:
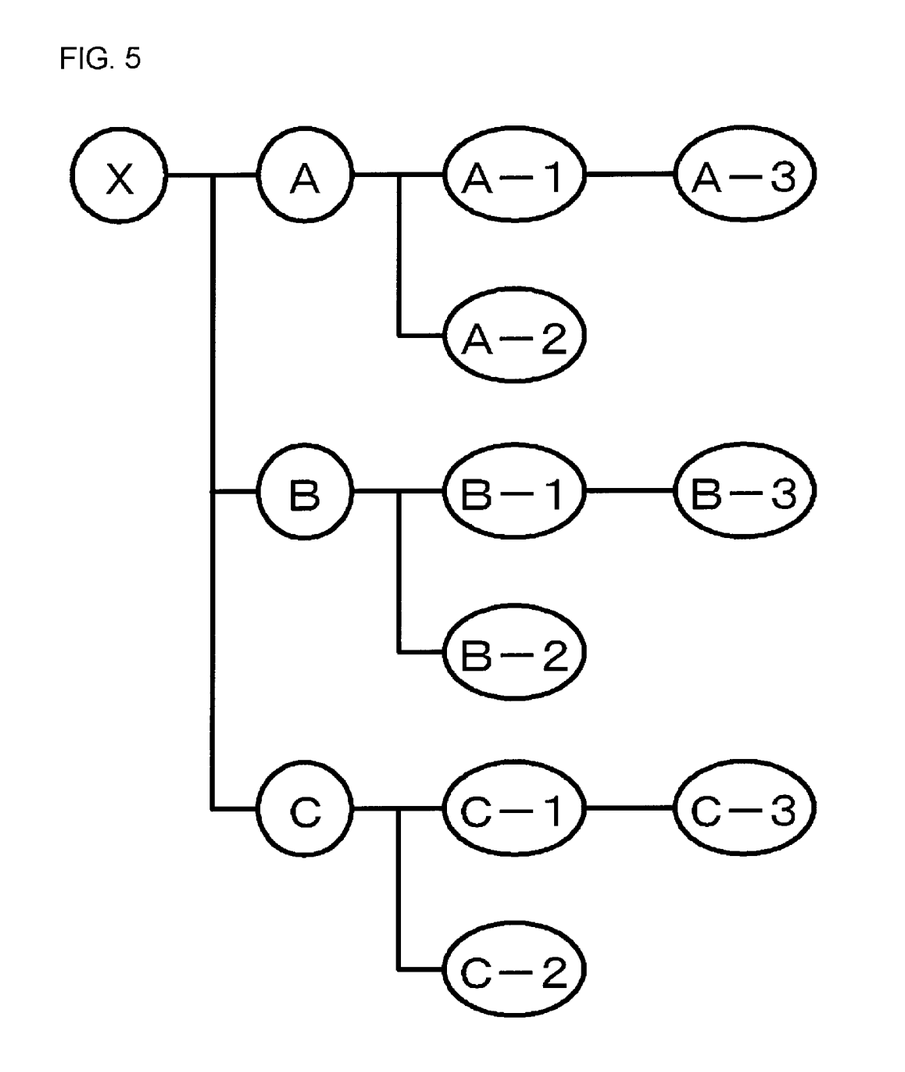
FIG. 5 is a view showing an example of a structure for product design data of the exemplary embodiment.

Product design data for the final produced product is stored in the product design storage unit 105 together with the corresponding unit design data. FIG. 5 shows an example of a data structure for the product design data. A configuration for a final produced product of part number X is illustrated in FIG. 5. The final produced product X is configured from a unit of assembled parts of part numbers A, B and C. The unit of assembled parts A is constructed from minimum unit parts of part numbers A-1, A-2, and A-3. A unit C of assembled parts is configured from minimum unit parts of part numbers C-1, C-2, and C-3. The unit design data for the units of assembled parts A and C is stored in the unit design storage unit 103.

When the product design data for the final produced product X is sent to the production management device 20, the transmission determination unit 109 read out in the product design data to be sent from the product design storage unit 105. The transmission determination unit 109 then determines whether or not unit design data for the product design data sent to the production management device 20 has been sent in the past. At this time, the transmission determination unit 109 refers to the standard design data stored in the standard registration unit 113.

Figure 7:
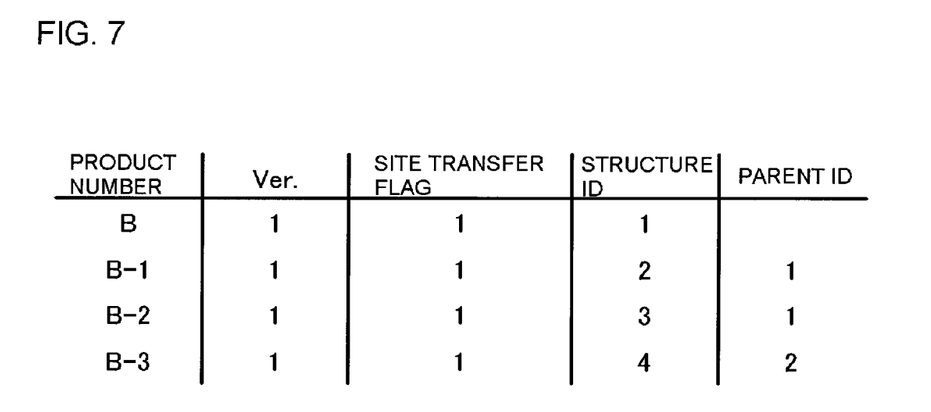
FIG. 7 is a view showing an example of a structure for standard design data.

FIG. 7 shows an example of the data structure for the standard registration unit 113. The unit B of assembled parts is stored in the standard registration unit 113 together with the minimum unit parts B-1, B-2, and B-3. Site transfer flags are correlated at the part numbers for the unit B of assembled parts and the minimum unit parts constituting this. A site transfer flag of "1" indicates that a transmission has taken place in the past. When a transmission has not taken place in the past, the site transfer flag is "0". The transmission determination unit 109 is therefore capable of understanding the presence of the standard design data for the unit B of assembled parts and that transmission has taken place in the past.

It is also possible to understand the assembly structure of the unit of assembled parts at the standard registration unit 113 by storing a structure ID and a new ID so as to correlate with the part numbers. The fact that the version number for the unit B of assembled parts is "1" is also stored at the standard registration unit 113.

The transmission determination unit 109 sends information that unit design data for the unit B of assembled parts corresponds to standard design data to have been sent in the past, together with the product design data to be sent to the transmission control unit 111. The transmission control unit 111 that receives this makes product design data for using transmission to the production management device 20. It is also possible for the transmission determination unit 109 to only transmit the determination results and for the transmission control unit 111 to only read corresponding product design data from the product design storage unit 105.

Figure 6:
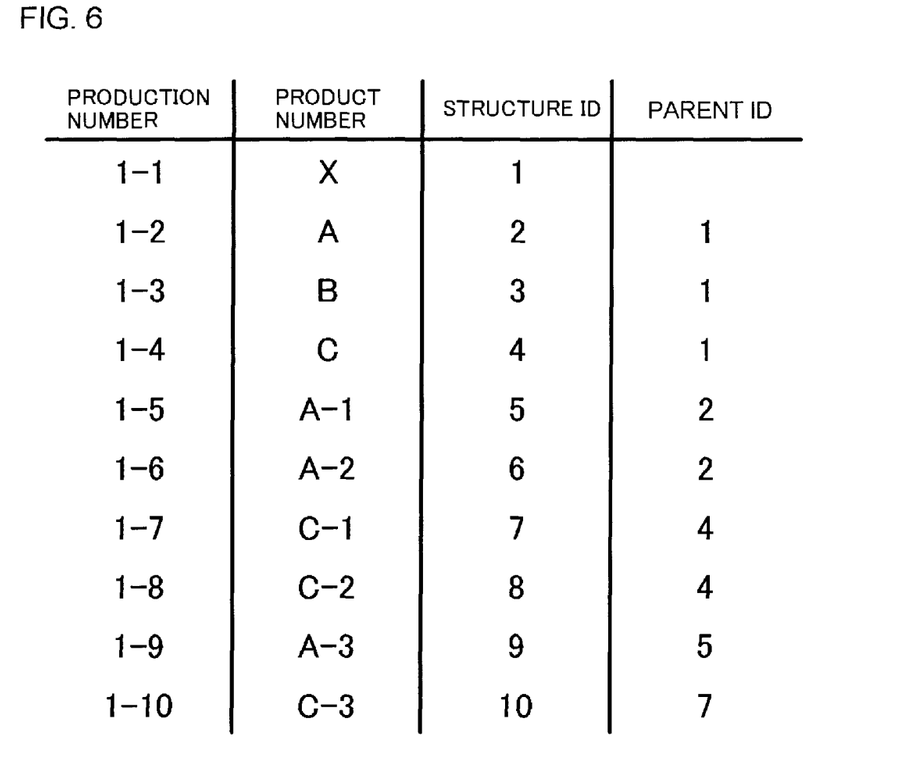
FIG. 6 is a view showing an example of a structure for product design data of the exemplary embodiment.

FIG. 6 illustrates an example of a data structure for product design data for transmission use made by the transmission control unit 111. It is also possible for the part numbers to be correlated with this structure ID and the new ID so that the assembled structure of the final produced product X can be understood. In this example, it is possible to understand that this is a unit of assembled parts for which the new ID is one.

Further, at this time, it is possible to assign a production number. A production number is called "seiban", which is a number assigned for production management. A production number can be assigned by the production management device as a result of receiving a production management schedule etc. in advance. When the production management device 20 then receives the product design data, the production management device 20 can then classify each item of data based on the production number.

The transmission control unit 111 therefore omits the part design data for the unit B of assembled parts because the unit B of assembled parts was transmitted in the past. In the table shown in FIG. 6, information for the minimum unit parts B-1, B-2 and B-3 is therefore omitted. However, the part number B is appended as identification information for the unit of assembled parts. As a result, the production management device 20 extracts data (for example, unit production data) relating to the stored unit B of assembled parts based on the identification information and performs data interpolation.

The data transmission unit 107 receives product design data for transmission use made in this manner from the transmission control unit 111 for transmission to the production management device 20.

After transmitting the data, the data transmission unit 107 registers the standard design data using the same data structure as for FIG. 7 for the units A and C of assembled parts with respect to the standard registration unit 113.

When the product design data for transmission use is received by the production management device 20 from the design management device 10, it is determined whether the unit design data included in the product design data is registered as unit production data. When the registration determination unit 211 receives, for example, the product design data for the final design product X illustrated in FIG. 6, it can be understood that the product members A, B, and C are for units of assembled parts because the new ID is "1".

The design management device 10 has sent the corresponding unit design data for the unit B of assembled parts in the past. Unit production data for the unit B of assembled parts is stored in the unit production storage unit 201. It is therefore possible to adopt the same structure as that stored in the unit design storage unit 103 as with, for example, that illustrated in FIG. 4.

By referring to the unit production storage unit 201, the registration determination unit 211 can determine which of the product design data newly received from the design management device 10 has been registered as unit production data for the unit B of assembled parts. When information that the unit B of assembled parts is registered is received from the registration determination unit 211, the data interpolation unit 213 extracts part production data for the unit B of assembled parts from the unit production storage unit 201 and is used to interpolate the product design data. The registration determination unit 211 then sends product design data interpolated using the data interpolation unit 213 using the parts production data to the production registration unit 207. The production registration unit 207 then generates product production data from the received data for storage in the product production storage unit 203. It is possible to adopt the same structure as, for example, the structure of data stored in the product design storage unit 105 as illustrated in FIG. 5 as the data structure for the product production data.

The registration determination unit 211 then stores the newly received unit design data for the units A and C of assembled parts as unit production data in the unit production storage unit 201. The part design data for each of the parts of the production numbers A-1, A-2, . . . is registered in the parts production storage unit 217 as the respective part production data. Each unit part is stored together with the number of items in the parts production storage unit 217. As a result, the production management device 20 can order the required parts based on the numbers stored in the product production data.

An example of the operation of the production management system 1000 when the design of the final produced product is changed is now explained.

The design update unit 115 receives changes in the design every unit of assembled parts. Specifically, changes in the part design data constituting a unit of assembled parts are received and the standard design data stored in the standard registration unit 113 is updated. The standard design data is then stored so as to be correlated to the version. It is therefore possible to provide separation of the standard design data for before and after updating without updating the part numbers.

Figure 8:
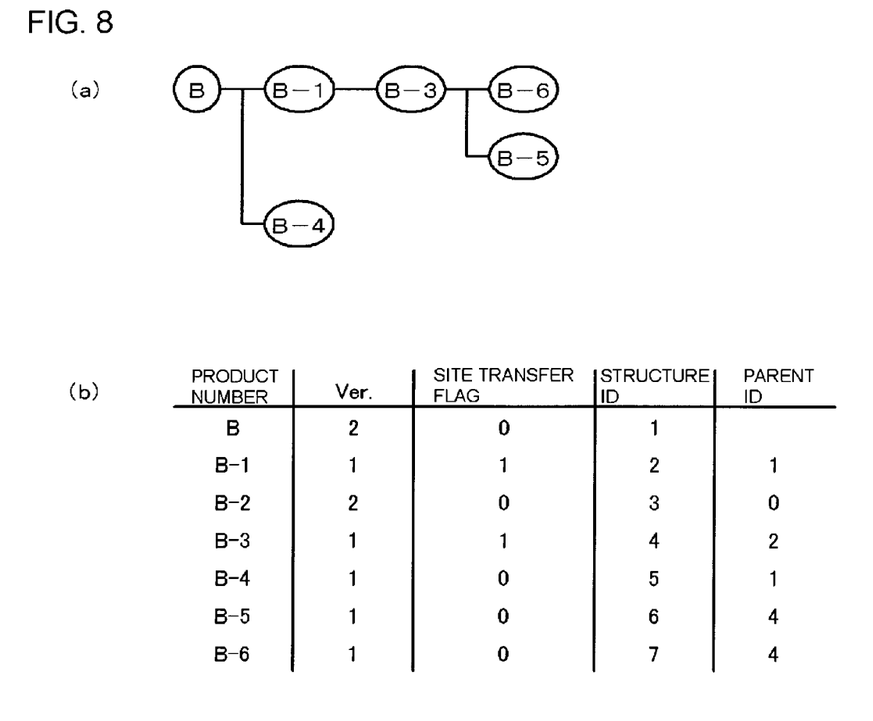
FIG. 8 is a view showing an example of a structure for standard design data.

It is possible to update the standard design data, for example, as shown below. It is taken that the design of the unit B of assembled parts is updated so as to give the assembled structure as illustrated in FIG. 8A. At this time, the design update unit 115 updates the corresponding standard design data stored in the standard registration unit 113 so as to give that illustrated in FIG. 8B. The new ID is taken to be "0" in order to delete the minimum unit part B-2. The information for the unit design parts for the part numbers B-4, B-5, and B-6 is then added. The version of the unit B of assembled parts is then updated from 1 to 2. The site transfer flag for the unit B of assembled parts then becomes "0" as a result of changing the version to "2". The site transfer flag for B-2 can also becomes "0" as a result of changing the version to "2". The site transfer flag for B-4, B-5, and B-6 is also set to "0" as these are not transmitted.

When it is understood that there is standard design data with a site transfer flag of "0" at the standard registration unit 113, the transmission determination unit 109 extracts the corresponding standard design data together with the part design data. Upon receiving this from the transmission determination unit 109, the transmission control unit 111 omits data for which the site transfer flag is "1" and makes update information for the unit design data. The data transmission unit 107 receives this update information from the transmission control unit 111 for transmission to the production management device 20. After this, the data transmission unit 107 changes the site transfer flags of the part numbers B, B-2, B-4, B-5, and B-6 stored in the standard registration unit 113 to "1".

The data receiving unit 205 receives the update information from the design management device 10 for transmission to the registration determination unit 211. The registration determination unit 211 refers to the unit production storage unit 201 and determines whether there is unit production data for the part number B. However, the version numbers do not match. It can therefore be understood that the received unit design data is update information. The registration determination unit 211 then sends the received update information to the data interpolation unit 213. The data interpolation unit 213 then updates the unit design data stored in the product production storage unit 203 and the unit production storage unit 201. Part data for B-4, B-5, and B-6 is then added to the parts production storage unit 217 and the registration is cancelled for B-2. As a result, it is possible to order by adding the minimum unit parts of part numbers B-4, B-5 and B-6 and cancel the order for the minimum unit parts of the part numbers B-2.

The effects of this exemplary embodiment are explained in the following. According to the system of this exemplary embodiment, a design management device determines whether or not unit design data for the product design data has been transmitted in the past. Unit design data that has been transmitted in the past can then be omitted from the transmission of the corresponding part design data. As a result, a production management device can receive a smaller amount of product design data. This reduces the load on the network.

According to the system of this exemplary embodiment, when product design data for a plurality of minimum units is received together with unit design data, a production management device takes the part design data to be part production data and takes the unit design data to be unit production data for registration in the unit production storage unit. It is then determined whether or not newly received unit design data for product design data is registered as unit production data. Part production data corresponding to unit production data determined to be registered is then acquired from the unit production storage unit for interpolating the product design data. As a result, the part design data can be interpolated and the product production data can be stored even in cases where product design data where the part design data is omitted is received. It is therefore no longer necessary to receive unnecessary part design data, the amount of information managed on the production management device side is reduced, and it is possible to effectively manage data.

It is also possible to store unit production data that is already stored on the production management device side as standard design data so as to enable the amount of data transmitted to be reduced by registering the standard design data. It is also possible to place orders in advance through the registration of standard design data even for units have assembled parts that take considerable man-hours to assemble.

According to the system of this exemplary embodiment, it is possible to update designs every unit design data by receiving updates of standard design data. As a result, it is possible to send changed part design data to the production management device in a manner correlated with the corresponding unit design data. The receiving production management device can then collectively change data for units of assembled parts corresponding to the stored unit production data. This means that only necessary information is transmitted and received even when there are design updates and the changes to designs can be reflected in production plans both rapidly and in a straightforward manner. It is also possible for production of the final produced product to be ordered in advance even when the design of the final produced product is not complete.

According to the system of this exemplary embodiment, it is possible to accept updating to the standard design data even when a design change occurs in the event that a unit of assembled parts or a final produced product is ordered in advance. It is therefore possible to change the design every unit design data and for modified part design data to be sent to the production management device in a manner correlated with the corresponding unit design data. It is therefore possible to collectively perform changes in data regarding units of assembled parts and minimum unit parts corresponding to stored unit production data at the receiving production management device.

It is therefore possible to order minimum unit parts and units of assembled parts with long delivery dates in advance at a time where design is not complete even when the final produced product is an on order production product and the final produced product can therefore be completed in a shorter time. This means that even when there are changes to minimum unit parts and units of assembled parts ordered in advance, such changes can be reflected rapidly in the production management. It is therefore possible to keep costs down and complete the production of production products on order in a shorter time.

Further, the part production data is stored in a manner correlated with the number of items of minimum unit parts at the production management device. It is therefore possible to store the number of items based on the received product design data, and to comprehend and rapidly order the number of parts required. It is also possible to add or cancel the orders for the minimum unit parts by receiving the updated standard design data.

A description is given in the above of exemplary embodiments of the present invention with reference to the drawings but these merely exemplify the present invention and various configurations other than those above can also be adopted.

For example, in the above example, an explanation is given of a production management system but it is also possible for a design management program having the means described at the design management device and a production management program having the means described at the production management device to be installed on a computer and for this computer to then implement the functions of the means. It is then possible for a computer-readable recording medium recorded with this kind of design management program and production management program to be read in by a computer, for the design management program and a production management program to be installed and to then bring about implementation by this computer functioning as the means.

A computer program having the same means is then installed on a computer having the same performance as the design management device and the production management device described above and can be implemented with a specification using the method described above.

This application claims priority based on Japanese Patent Application No. 2007-266946 filed on Oct. 12, 2007, the entire disclosure of which is incorporated herein by reference in its entirety.

An explanation is given of the present invention with reference to exemplary embodiments above but the present invention is by no means limited to the above exemplary embodiments. Various modifications can be made to the structure and detail of the present invention within the scope of the present invention by one skilled in the art.

The invention claimed is:

1. A production management device managing data for the production of a final produced product, comprising:
    a unit production storage section storing unit production data for a unit of assembled parts produced, wherein the unit production data includes a plurality of minimum unit parts together with corresponding part production data for said minimum unit parts;
    a product production storage unit storing product production data for each of said final produced product produced, wherein the product production data includes a plurality of units of assembled parts together with said corresponding unit production data for each of said units of assembled parts;
    a data receiving unit receiving corresponding unit design data for a plurality of units of assembled parts together with product design data for said final produced product from a design management device configured to manage data for the design of said final produced product;
    a product production registration unit registering received product design data in said product production storage unit as said product production data;
    a unit production registration section registering part design data in said unit production storage section as said part production data when said part design data for a plurality of minimum unit parts is received together with said unit design data, and registering said unit design data in said unit production storage section to be unit production data that includes part or all of said unit design data;
    a registration determination unit determining whether or not said unit design data for newly received product design data is registered as unit production data that includes part or all of said unit design data; and
    a data interpolation unit acquiring said part production data corresponding to said unit production data determined to be registered from said unit production storage section for interpolation of said product design data.

2. The production management device according to claim 1, further comprising a part production storage unit for storing said part production data in a manner correlated with the number of items of said minimum unit parts based on said received product design data.

3. The production management device according to claim 1, wherein data information for said unit design data is received, and said unit production data is updated based on received update information.

4. A production management method for managing data for the production of a final produced product, comprising:
    storing unit production data for a unit of assembled parts, wherein the unit production data includes a plurality of minimum unit parts together with corresponding part production data for said minimum unit parts;
    storing product production data for said final produced product produced, wherein the product production data includes a plurality of units of assembled parts together with said corresponding unit production data for each of said units of assembled parts;
    receiving corresponding unit design data for a plurality of units of assembled parts together with product design data for said final produced product from a design management device managing data for the design of said final produced product;
    registering received part design data in a product production storage unit as said product production data;
    registering said product design data as said part production data when part design data for a plurality of minimum unit parts is received together with said unit design data, and registering said unit design data to be unit production data that includes part or all of said unit design data;
    determining whether said unit design data for newly received product design data is registered as unit production data including part or all of said unit design data; and
    acquiring said part production data corresponding to said unit production data determined to be registered for interpolating said product design data.

5. A production management system where a design management device for managing data for the design of a final produced product and a production management device for managing data for production of a final produced product are connected via a network,
    said design management device comprising:
    a unit design storage section for storing unit design data for a unit of assembled parts produced, wherein the unit design data includes a plurality of minimum unit parts together with corresponding part design data for each of said plurality of minimum unit parts;
    a product design storage unit for storing product design data for said final produced product produced, wherein the product design data includes a plurality of units of assembled parts together with said corresponding unit design data for each of said units of assembled parts;
    a data transmission unit for sending said product design data to said production management device together with said corresponding unit design data and said part design data;

a transmission determination unit for determining whether or not said unit design data for said product design data sent to said production management device was transmitted in the past; and a transmission control unit configured to not transmit corresponding part design data when said unit design data determined to have been transmitted in the past is sent, and said production management device comprising:

a unit production storage section for storing unit production data for a unit of assembled parts together with corresponding part production data for a plurality of minimum unit parts for each of said units of assembled parts;

a product production storage unit for storing product production data for said final produced product produced, wherein the product production data includes a plurality of said units of assembled parts together with said corresponding unit production data;

a data receiving unit for receiving corresponding unit design data for a plurality of units of assembled parts together with product design data for said final produced product from said design management device;

a product production registration unit for registering said received product design data in said product production storage unit as said product production data;

a unit production registration section for registering part design data in said unit production storage section as said part production data when said part design data for a plurality of minimum units are received together with said unit design data, and registering said unit design data in said unit production storage section to be unit production data that includes part or all of said unit design data;

a registration determination unit for determining whether or not said unit design data for newly received product design data is registered as unit production data that includes part or all of said unit design data; and a data interpolation unit for acquiring said part production data corresponding to said unit production data determined to be registered from said unit production storage section for interpolating the product design data.

6. A non-transitory computer-readable medium storing a program for managing data for the design of a final produced product, including:

a unit design data storage section storing unit design data for a unit of assembled parts produced, wherein the unit design data includes a plurality of minimum unit parts together with corresponding part design data for each of said plurality of minimum unit parts;

a product design storage unit storing product design data for said final produced product produced, wherein the product design data includes at least one unit of assembled parts together with said corresponding unit design data for each of said units of assembled parts;

wherein, when executed, said program causes:

a data transmission unit to send said product design data to a production management device for managing data for the production of said final produced product together with said corresponding unit design data and said part design data, wherein the production management device comprises:

a unit production storage section storing unit production data for a unit of assembled parts produced, wherein the unit production data includes a plurality of minimum unit parts together with corresponding part production data for said plurality of minimum unit parts;

a unit product registration section to register part design data in said unit production storage section as said part production data when said part design data for a plurality of minimum units is received together with said unit design data, and to register said unit design data in said unit production storage section to be unit production data that includes part or all of said unit design data;

a registration determination unit to determine whether said unit design data for newly received product design data is registered as unit production data including part or all of said unit design data; and a data interpolation unit to acquire said part production data corresponding to said unit production data determined to be registered from said unit production storage section for interpolating said product design data;

wherein, said program further causes:

a transmission determination unit to determine whether or not said unit design data for said product design data sent to said production management device was transmitted in the past; and a transmission control unit to determine whether or not to transmit said corresponding part design data when said unit design data determined to have been transmitted in the past is sent.

7. A non-transitory computer-readable medium storing a program managing data for the design of a final produced product, including:

a unit production storage section storing unit production data for a unit of assembled parts produced, wherein the unit production data includes a plurality of minimum unit parts together with corresponding part production data for said plurality of minimum unit parts;

a product production storage unit storing product production data for said final produced product produced, wherein the product production data includes a plurality of units of assembled parts;

wherein, when executed, said program causes:

a data receiving unit to receive corresponding unit design data for a plurality of units of assembled parts together with product design data for said final produced product from a design management device managing data for the design of said final produced product;

a product production registration unit to register said received product design data in said product production storage unit as said product production data;

a unit product registration section to register part design data in said unit production storage section as said part production data when said part design data for a plurality of minimum units is received together with said unit design data, and to register said unit design data in said unit production storage section to be unit production data that includes part or all of said unit design data;

a registration determination unit to determine whether said unit design data for newly received product design data is registered as unit production data including part or all of said unit design data; and a data interpolation unit to acquire said part production data corresponding to said unit production data determined to be registered from said unit production storage section for interpolating said product design data.

* * * * *